(12) United States Patent
Chen

(10) Patent No.: US 10,598,980 B2
(45) Date of Patent: Mar. 24, 2020

(54) PIXEL STRUCTURE AND DISPLAY PANEL HAVING THE SAME

(71) Applicants: HKC Corporation Limited, Shenzhen, Guangdong (CN); Chongqing HKC Optoelectronics Technology Co., Ltd., Chongqing (CN)

(72) Inventor: Yu-Jen Chen, Chongqing (CN)

(73) Assignees: HKC Corporation Limited, Shenzhen, Guangdong (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 51 days.

(21) Appl. No.: 15/555,902

(22) PCT Filed: Jul. 7, 2017

(86) PCT No.: PCT/CN2017/092138
§ 371 (c)(1),
(2) Date: Sep. 5, 2017

(87) PCT Pub. No.: WO2018/223479
PCT Pub. Date: Dec. 13, 2018

(65) Prior Publication Data
US 2018/0356676 A1    Dec. 13, 2018

(30) Foreign Application Priority Data

Jun. 8, 2017  (CN) .......................... 2017 1 0429039

(51) Int. Cl.
*G02F 1/1335* (2006.01)
*G02F 1/1345* (2006.01)

(52) U.S. Cl.
CPC ...... *G02F 1/133514* (2013.01); *G02F 1/1345* (2013.01); *G02F 2201/52* (2013.01)

(58) Field of Classification Search
CPC ............ G02F 1/133514; G02F 1/1345; G02F 2201/52
See application file for complete search history.

(56) References Cited

U.S. PATENT DOCUMENTS 7,948,506 B2 * 5/2011 Cok ...................... G09G 3/2003
                                                        345/694
2005/0225575 A1 * 10/2005 Brown Elliott ... G02F 1/133514
                                                        345/694

(Continued)

FOREIGN PATENT DOCUMENTS

CN    103792725 A    5/2014
CN    105096765 A    11/2015

(Continued)

*Primary Examiner* — Huyen L Ngo
(74) *Attorney, Agent, or Firm* — Muncy, Geissler, Olds & Lowe, P.C.

(57) ABSTRACT

This application provides a pixel structure and a display panel having the same. The pixel structure includes: a plurality of data lines; a plurality of scanning lines, disposed in a manner of intersecting with the data lines; and a plurality of pixel units, where each of the pixel units includes a plurality of subpixels, and the subpixels are connected to the data lines and the scanning lines; and each of the pixel units includes a plurality of monochromatic subpixels disposed in a form of an array and a plurality of white subpixels, the white subpixels and the monochromatic subpixels are disposed in pairs and adjacent to each other, and colors of the plurality of monochromatic subpixels in each of the pixel units are different.

5 Claims, 7 Drawing Sheets

(56) References Cited

U.S. PATENT DOCUMENTS

2007/0257944 A1* 11/2007 Miller .................. G09G 3/3225
                                                                         345/694
2008/0049048 A1* 2/2008 Credelle .............. G09G 3/2074
                                                                         345/690
2012/0268357 A1   10/2012 Shih et al.

FOREIGN PATENT DOCUMENTS

| CN | 105185244 A | 12/2015 |
| CN | 106023819 A | 10/2016 |
| CN | 106206657 A | 12/2016 |

\* cited by examiner

PIXEL STRUCTURE AND DISPLAY PANEL HAVING THE SAME

BACKGROUND

Technical Field

This application relates to a design of a pixel structure, and in particular, to a pixel structure and a display panel having the same.

Related Art

An existing display panel includes a plurality of pixels. Each pixel includes at least three subpixels of different colors. When each pixel includes three subpixels of different colors, the three subpixels are respectively a red subpixel R, a green subpixel G, and a blue subpixel B. When the display panel needs to display a color, grayscale values of the RGB subpixels may be adjusted to obtain the required color by means of combination, thereby presenting a colorful image.

Currently, light penetration of the RGB subpixels is far lower than penetration of a white subpixel W. Therefore, to increase penetration of light through a display panel to improve display luminance, a white subpixel W is added to each pixel. In addition, colors of a displayed image may further be enriched by adding a white subpixel W to each pixel.

However, when the display panel displays a color, a white subpixel can be displayed in a totally different color only with the help of a subpixel in an adjacent row or in an adjacent column, leading to relatively low color saturation of the display panel, and affecting image quality. Consequently, the image quality is relatively low, and a boundary between bright and dark areas of the displayed image is excessively apparent. In addition, because a white subpixel W is added, actual display resolution of a four-color RGBW display panel is not as high as actual display resolution of a three-color RGB display panel.

SUMMARY

To resolve the foregoing technical problem, an objective of this application is to provide a pixel structure and a display panel having the same.

The objective of this application is achieved and the technical problem of this application is resolved by using the following technical solutions. A pixel structure provided according to this application comprises: a plurality of data lines; a plurality of scanning lines, disposed in a manner of intersecting with the data lines; and a plurality of pixel units, where each of the pixel units comprises a plurality of subpixels, and the subpixels are connected to the data lines and the scanning lines; and each of the pixel units comprises a plurality of monochromatic subpixels disposed in a form of an array and a plurality of white subpixels, the white subpixels and the monochromatic subpixels are disposed in pairs and adjacent to each other, and colors of the plurality of monochromatic subpixels in each of the pixel units are different.

The objective of this application may further be achieved and the technical problem of this application may further be resolved by using the following technical solutions.

In an embodiment of this application, the pixel unit has a two-column three-row structure or a three-column two-row structure.

In an embodiment of this application, the pixel unit has a two-column three-row structure, and the pixel unit comprises three monochromatic subpixels disposed in a form of an array in a first column and three white subpixels disposed in a form of an array in a second column.

In an embodiment of this application, the data lines comprise a first data line and a second data line disposed at intervals, the first data line is connected to the monochromatic subpixels, and the second data line is connected to the white subpixels.

In an embodiment of this application, each of the scanning lines is connected to the monochromatic subpixels and the white subpixels, and the monochromatic subpixels and the white subpixels are disposed at intervals and adjacent to each other.

In an embodiment of this application, when the pixel unit has a three-column two-row structure, the pixel unit comprises three monochromatic subpixels disposed in a form of an array in a first row and three white subpixels disposed in a form of an array in a second row.

In an embodiment of this application, the scanning lines comprise a first scanning line and a second scanning line disposed at intervals, the first scanning line is connected to the monochromatic subpixels, and the second scanning line is connected to the white subpixels.

In an embodiment of this application, each of the data lines is connected to the monochromatic subpixels and the white subpixels, and the monochromatic subpixels and the white subpixels are disposed at intervals and adjacent to each other.

Another objective of this application is to provide a display panel, comprising: a first substrate; a second substrate, disposed opposite to the first substrate; and a pixel structure, comprising: a plurality of data lines; a plurality of scanning lines, disposed in a manner of intersecting with the data lines; and a plurality of pixel units, where each of the pixel units comprises a plurality of subpixels, and the subpixels are connected to the data lines and the scanning lines; and each of the pixel units comprises a plurality of monochromatic subpixels disposed in a form of an array and a plurality of white subpixels, the white subpixels and the monochromatic subpixels are disposed in pairs and adjacent to each other, and colors of the plurality of monochromatic subpixels in each of the pixel units are different.

In an embodiment of this application, the pixel unit has a two-column three-row structure or a three-column two-row structure.

In an embodiment of this application, the pixel unit has a two-column three-row structure, and the pixel unit comprises three monochromatic subpixels disposed in a form of an array in a first column and three white subpixels disposed in a form of an array in a second column.

In an embodiment of this application, the data lines comprise a first data line and a second data line disposed at intervals, the first data line is connected to the monochromatic subpixels, and the second data line is connected to the white subpixels.

In an embodiment of this application, each of the scanning lines is connected to the monochromatic subpixels and the white subpixels, and the monochromatic subpixels and the white subpixels are disposed at intervals and adjacent to each other.

In an embodiment of this application, when the pixel unit has a three-column two-row structure, the pixel unit comprises three monochromatic subpixels disposed in a form of an array in a first row and three white subpixels disposed in a form of an array in a second row.

In an embodiment of this application, the scanning lines comprise a first scanning line and a second scanning line disposed at intervals, the first scanning line is connected to the monochromatic subpixels, and the second scanning line is connected to the white subpixels.

In an embodiment of this application, each of the data lines is connected to the monochromatic subpixels and the white subpixels, and the monochromatic subpixels and the white subpixels are disposed at intervals and adjacent to each other.

Still another objective of this application is to provide a pixel structure, comprising: a plurality of data lines; a plurality of scanning lines, disposed in a manner of intersecting with the data lines; and a plurality of pixel units. Each of the pixel units comprises a plurality of subpixels, and the subpixels are connected to the data lines and the scanning lines. Each of the pixel units comprises a plurality of monochromatic subpixels disposed in a form of an array and a plurality of white subpixels. The white subpixels and the monochromatic subpixels are disposed in pairs and adjacent to each other. The monochromatic subpixel is a red subpixel, a green subpixel, or a blue subpixel. The pixel unit has a two-column three-row structure, and comprises three monochromatic subpixels disposed in a form of an array in a first column and three white subpixels disposed in a form of an array in a second column. Colors of the plurality of monochromatic subpixels in each of the pixel units are different. The data lines comprise a first data line and a second data line disposed at intervals, the first data line is connected to the monochromatic subpixels, and the second data line is connected to the white subpixels. Each of the scanning lines is connected to the monochromatic subpixels and the white subpixels, and the monochromatic subpixels and the white subpixels are disposed at intervals and adjacent to each other. The scanning line and the data line are separately or jointly driven, and each of the scanning lines is connected to and controls the monochromatic subpixels of a same color and the white subpixels.

In this application, a pixel structure is designed, so as to increase penetration and resolution of a panel, improve image display quality of the panel, and improve reliability.

DETAILED DESCRIPTION

The following embodiments are described with reference to the accompanying drawings, which are used to exemplify specific embodiments for implementation of this application. Terms about directions mentioned in this application, such as "on", "below", "front", "back", "left", "right", "in", "out", and "side surface" merely refer to directions in the accompanying drawings. Therefore, the used terms about directions are used to describe and understand this application, and are not intended to limit this application.

The accompanying drawings and the description are considered to be essentially exemplary, rather than limitative. In the figures, units with similar structures are represented by using the same reference number. In addition, for understanding and ease of description, the size and the thickness of each component shown in the accompanying drawings are arbitrarily shown, but this application is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that when a component such as a layer, a film, an area, or a substrate is described to be "on" another component, the component may be directly on the another component, or there may be an intermediate component.

In addition, in this specification, unless otherwise explicitly described to have an opposite meaning, the word "include" is understood as including the component, but not excluding any other component. In addition, in this specification, "on" means that a component is located on or below a target component, but does not mean that the component needs to be located on top of the gravity direction.

To further describe the technical means adopted in this application to achieve the intended application objective and effects thereof, specific implementations, structures, features, and effects of a pixel structure and a display panel having the same provided according to this application are described below in detail with reference to the drawings and preferred embodiments.

Figure 1A:
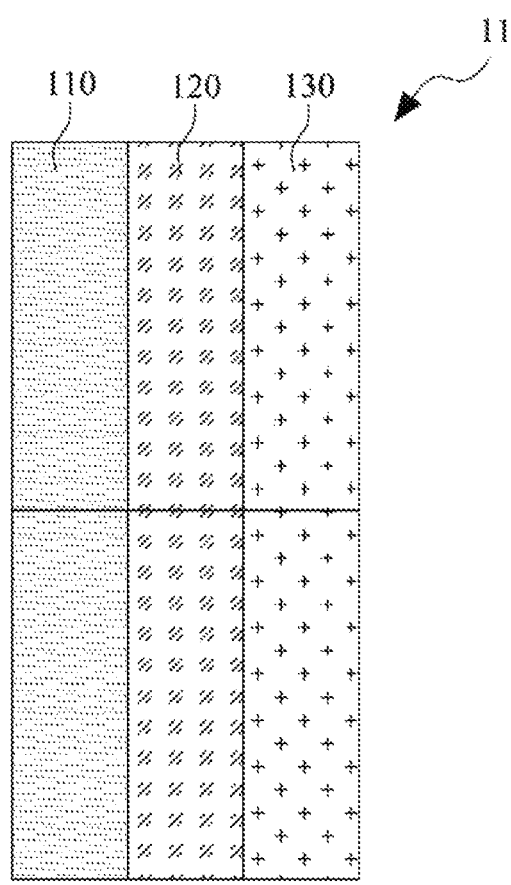
FIG. 1a is a schematic diagram of an exemplary three-color subpixel structure.
Figure 1B:
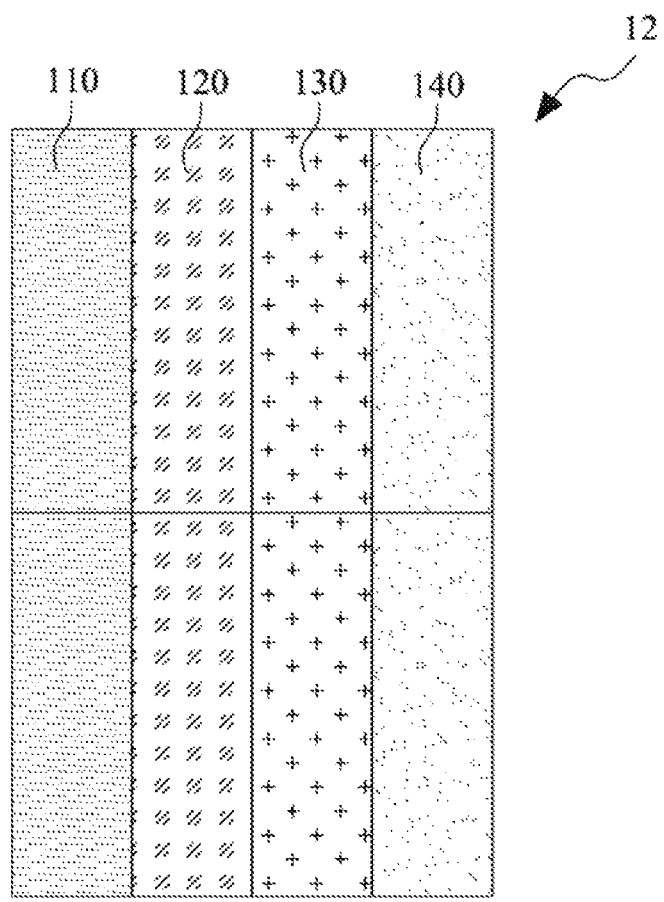
FIG. 1b and FIG. 1c are schematic diagrams of an exemplary four-color subpixel structure.
Figure 1C:
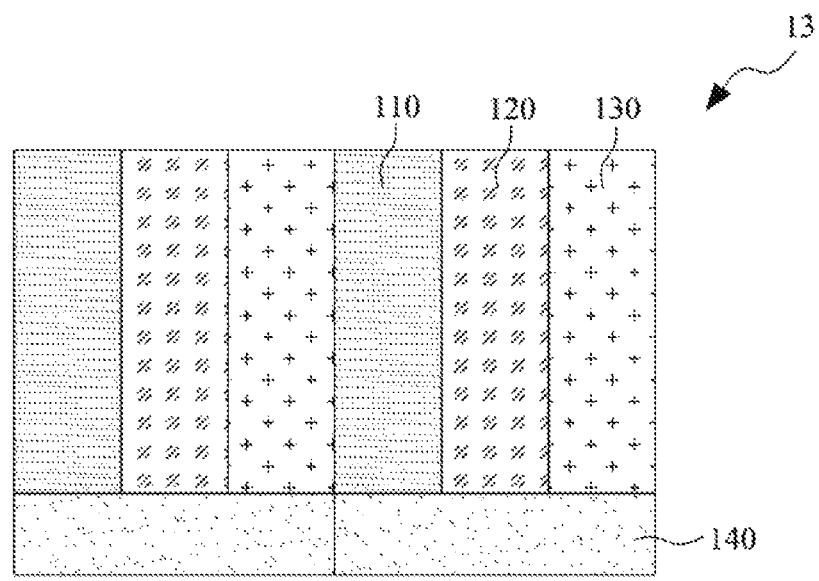

FIG. 1a is a schematic diagram of an exemplary three-color subpixel structure. Referring to FIG. 1a, an exemplary three-color display panel has a three-color subpixel 11, for example, a red subpixel 110, a green subpixel 120, and a blue subpixel 130 arranged in a form of an array. The display panel is irradiated by using a backlight source, to transmit required red, green, and blue light. FIG. 1b and FIG. 1c are schematic diagrams of an exemplary four-color subpixel structure. Referring to FIG. 1b and FIG. 1c, for example, compared with the three-color display panel, a four-color display panel additionally includes a white subpixel 140. The four-color display panel has a pixel structure 12 and a pixel structure 13 including four subpixels of different colors. Penetration of the panel can be increased by adding the white subpixel 140. The pixel structure 12 and the pixel structure 13 may be, for example, a structure with four subpixels of different colors (shown in FIG. 1b) arranged in parallel, or a structure with three-primary-color subpixels arranged in parallel and with a white subpixel under the three-primary-color subpixels (shown in FIG. 1c). However, as resolution of a display panel is increased, the size of a corresponding pixel becomes smaller. On the other hand, a corresponding drive circuit cannot be refined in a same ratio, leading to a decrease in an aperture ratio of the pixel. To meet a luminance requirement of a display panel, a backlight source needs to provide backlight of a higher intensity. This disadvantage leads to a significant increase in power consumption of the display panel and an apparatus having the same, and further affects overall performance of the display panel and the apparatus having the same.

Figure 2:
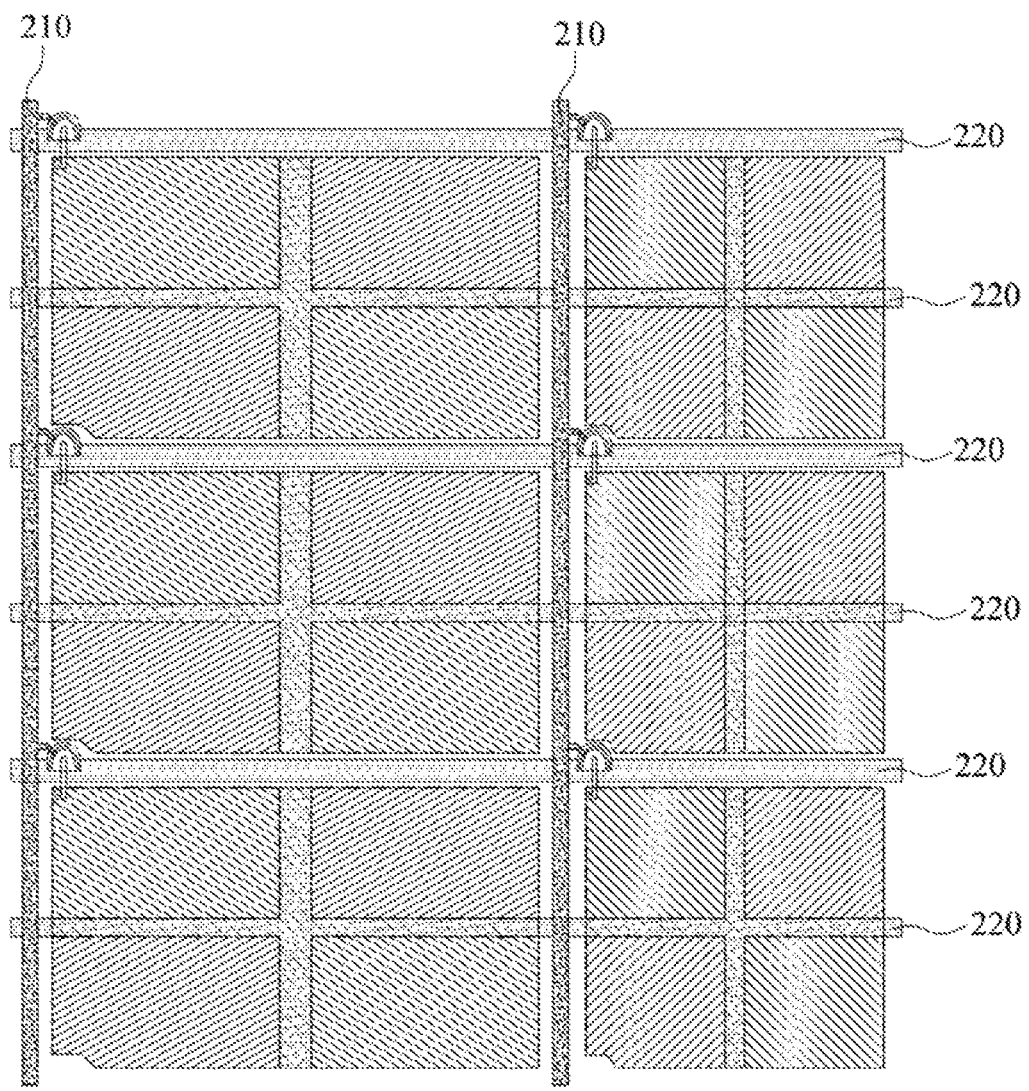
FIG. 2 is a schematic diagram of an electrode of a pixel unit according to an embodiment of the present invention.
Figure 3:
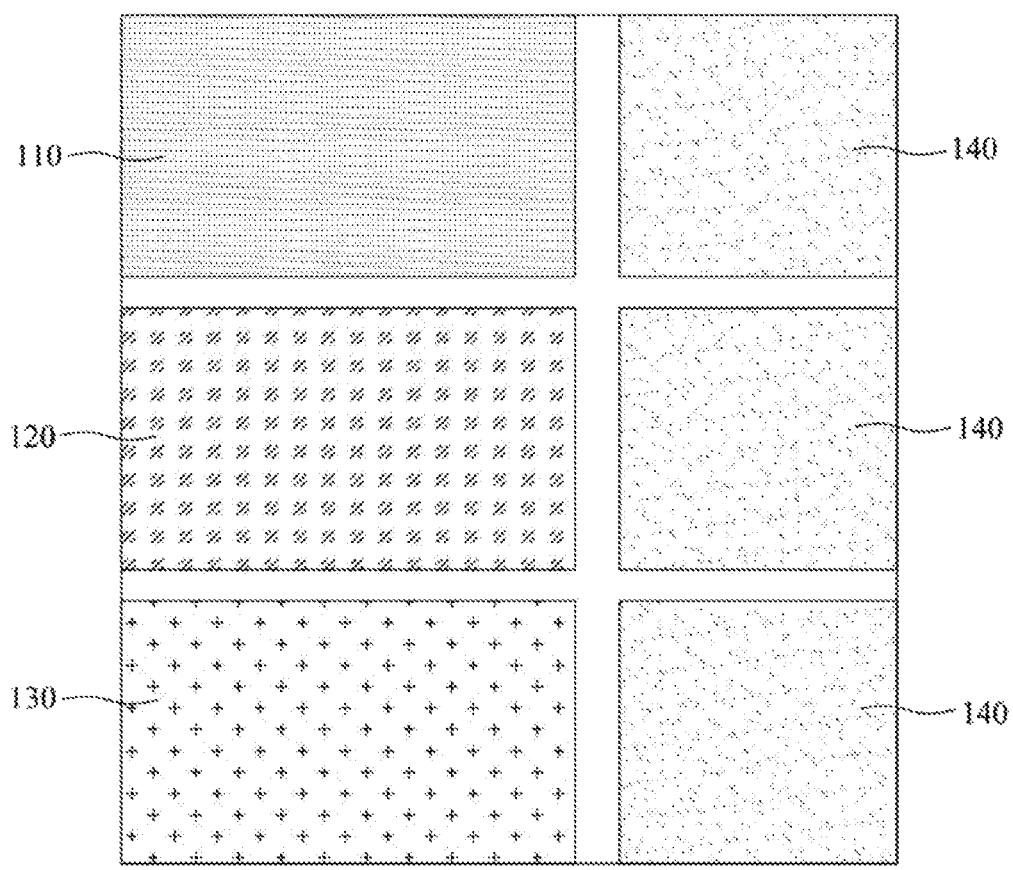
FIG. 3 is a schematic diagram of a pixel unit according to an embodiment of the present invention.
Figure 4:
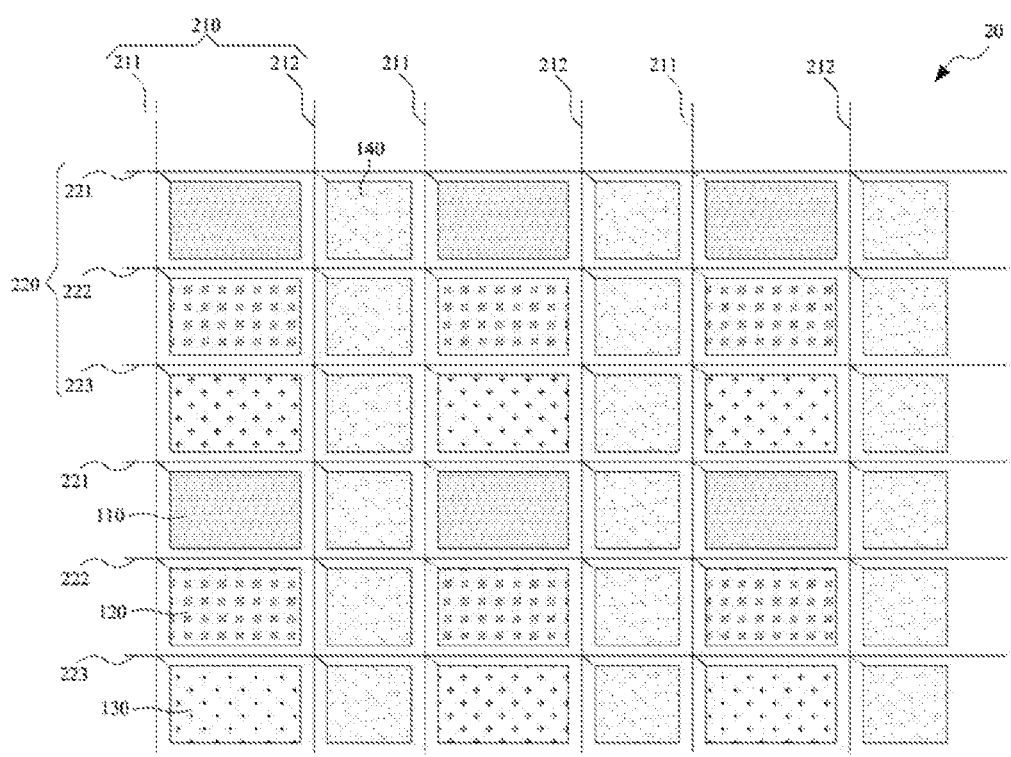
FIG. 4 is a schematic diagram of a pixel structure according to an embodiment of the present invention.

FIG. 2 is a schematic diagram of an electrode of a pixel unit according to an embodiment of the present invention, FIG. 3 is a schematic diagram of a pixel unit according to an embodiment of the present invention, and FIG. 4 is a schematic diagram of a pixel structure according to an embodiment of the present invention. Referring to FIG. 2 to FIG. 4, a pixel structure 20 includes: a plurality of data lines 210; a plurality of scanning lines 220, disposed in a manner of intersecting with the data lines 210; and a plurality of pixel units. Each of the pixel units includes a plurality of subpixels, and the subpixels are connected to the data lines 210 and the scanning lines 220. Each of the pixel units includes a plurality of monochromatic subpixels disposed in a form of an array and a plurality of white subpixels 140. The white subpixels 140 and the monochromatic subpixels are disposed in pairs and adjacent to each other.

In an embodiment of this application, the pixel unit may have, for example, a two-column three-row structure including six subpixels. The pixel unit includes three monochromatic subpixels disposed in a form of an array in a first column and three white subpixels 140 disposed in a form of an array in a second column.

In an embodiment of this application, the data lines 210 include a first data line 211 and a second data line 212 disposed at intervals. The first data line 211 is connected to the monochromatic subpixels, and the second data line 212 is connected to the white subpixels.

In an embodiment of this application, the scanning lines include a first scanning line 221, a second scanning line 222, and a third scanning line 223. Each of the scanning lines (221, 222, and 223) is connected to the monochromatic subpixels and the white subpixels 140. The monochromatic subpixels and the white subpixels are disposed at intervals and adjacent to each other.

In an embodiment of this application, the plurality of scanning lines (221, 222, and 223) and the plurality of data lines (211 and 212) may be jointly or separately driven by using a driver module. That is, the three scanning lines (221, 222, 223) controlling different monochromatic subpixels and white subpixels do not affect each other or interfere with each other. In addition, because each of the scanning lines (221, 222, and 223) in the pixel structure 20 is connected to and controls monochromatic subpixels of a same color and white subpixels, the pixel structure 20 can be driven in a more flexible and more efficient manner.

In some embodiments, colors of the three monochromatic subpixels in each of the pixel units are different. The monochromatic subpixels may be, for example, a red subpixel 110, a green subpixel 120, and a blue subpixel 130. However, due to an occasion requirement and a design requirement, the monochromatic subpixel may be a subpixel of another color, for example, a yellow subpixel or a cyan subpixel. This is not limited.

In some embodiment, the electrode of the pixel unit may have a plurality of different forms. The electrode of the pixel unit may be, for example, of an eight-spoked-asterisk-shaped structure. The structure of the electrode may be symmetric or asymmetric, to increase a viewing angle. FIG. 2 shows a mirror-symmetrical eight-spoked-asterisk-shaped electrode of a pixel unit. However, in this structure, because angles between strip-like branches and a vertical trunk are the same, there is a visual color difference and a visual color shift.

In addition, to reduce or eliminate the visual color difference and the visual color shift of the display panel, in some embodiments, the monochromatic subpixels (110, 120, and 130) and the white subpixels 140 may be in multi-domain alignment pixel structures. That is, a plurality of pixel domains of different heights is formed in a pixel structure. The plurality of pixel domains of different heights may be disposed symmetrically or asymmetrically on both sides of a center line of the pixel structure. According to a design of this structure, when a same subpixel is driven, liquid crystal tilt angles on pixel domains of different heights are different. Therefore, transmitted light also has different angles, thereby improving an image display effect, and eliminating a phenomenon of a poor vision effect.

In some embodiments, the monochromatic subpixels (110, 120, and 130) are the same in shape and area, and the white subpixels 140 are the same in shape and area. The shapes of the monochromatic subpixels (110, 120, and 130) and the white subpixels 140 are all rectangles. According to an actual requirement, the monochromatic subpixels (110, 120, and 130) and the white subpixels 140 may be designed as other shapes.

In some embodiments, a ratio of areas of the monochromatic subpixels (110, 120, and 130) to areas of the white subpixels 140 may be, for example, in a range of 1.5 to 4. According to a requirement of a designer, the ratio of the areas of the monochromatic subpixels (110, 120, and 130) to the areas of the white subpixels 140 may also be in a range of 1 to 1.5, or may be in a range of less than 1. This is not limited in this specification. An aperture ratio and resolution of the display panel may be properly adjusted according to a difference in the ratio of the areas of the monochromatic subpixels (110, 120, and 130) to the areas of the white subpixels 140, to adapt to different occasion requirements.

In some embodiments, because the white subpixels 140 are in an adjacent structure, on one hand, the design can simplify a process of the pixel structure to complete a color filter layer more efficiently. On the other hand, because the monochromatic subpixels (110, 120, and 130) and the white subpixels 140 are designed to be in pairs and adjacent to each other, and ratios of an area of each monochromatic subpixel (110, 120, and 130) to an area of the white subpixel 140 are the same, visual effects of the white subpixel 140 on each monochromatic subpixel are the same, so that image saturation can be improved.

In some embodiments, the monochromatic subpixels (110, 120, and 130) may be located, for example, in a main pixel domain, and the white subpixels 140 may be located, for example, in a subpixel domain. In a same pixel unit, locations of the monochromatic subpixels (110, 120, and 130) and locations of the white subpixels 140 may be changed according to a requirement. That is, the white subpixels 140 are located in the main pixel domain, and the monochromatic subpixels (110, 120, and 130) are located in the subpixel domain, to increase penetration of the display panel.

Figure 5:
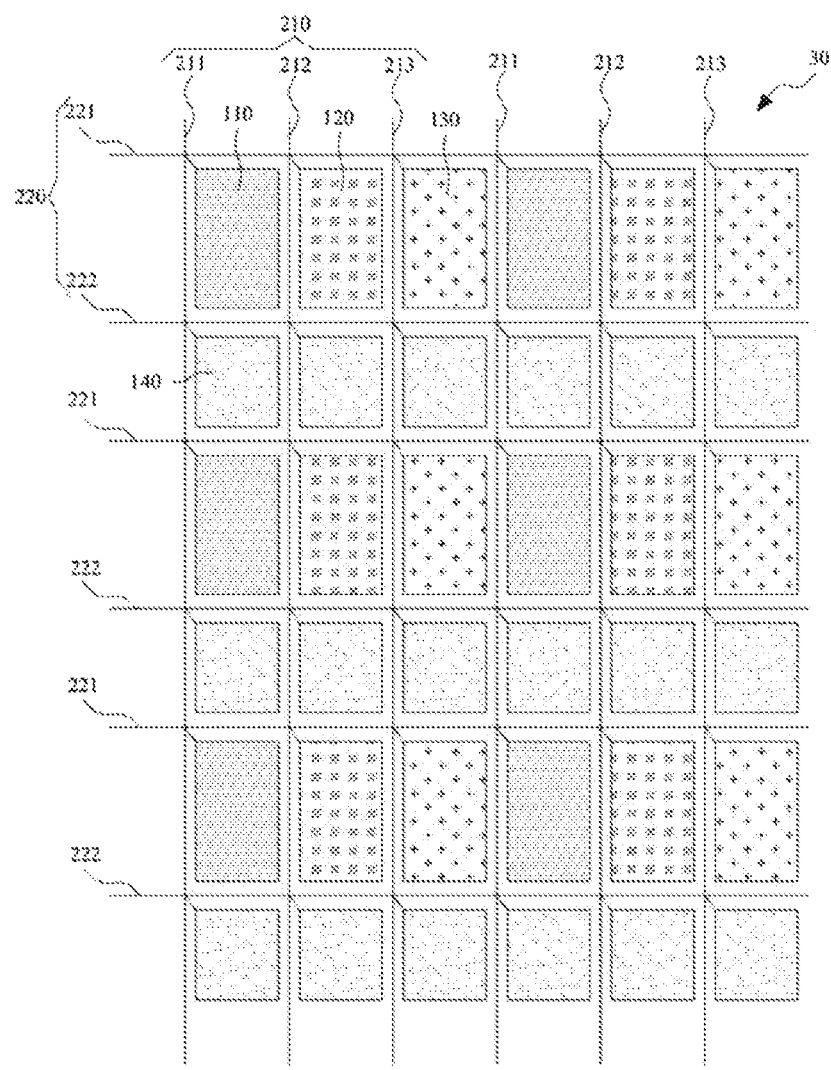
FIG. 5 is a schematic diagram of a pixel structure according to another embodiment of the present invention.

FIG. 5 is a schematic diagram of a pixel structure according to another embodiment of the present invention. In an embodiment, to achieve the objective of this application, the pixel unit may also have a three-column two-row structure. As shown in FIG. 5, compared with the pixel structure 20 in the foregoing embodiment, a host architecture of an electrode of a pixel unit of the pixel structure 20 is the same as a host architecture of an electrode of a pixel unit of a pixel structure 30. A difference is that the pixel structure 30 includes three monochromatic subpixels disposed in a form of an array in a first row and three white subpixels 140 disposed in a form of an array in a second row.

In an embodiment of this application, the scanning lines 220 include a first scanning line 221 and a second scanning line 222 disposed at intervals. The first scanning line 221 is connected to the monochromatic subpixels, and the second scanning line 222 is connected to the white subpixels 140. The data line 210 includes a first data line 211, a second data line 212, and a third data line 213. Each of the data lines (211, 212, and 213) is connected to the monochromatic subpixels and the white subpixels 140. The monochromatic subpixels and the white subpixels 140 are disposed at intervals and adjacent to each other.

In an embodiment of this application, the plurality of scanning lines (221 and 222) and the plurality of data lines (211, 212, and 213) may be jointly or separately driven by using a driver module. That is, the data lines (211, 212, and 213) controlling different monochromatic subpixels and white subpixels 140 do not affect each other or interfere with each other. Alternatively, because each of the data lines (211, 212, and 213) in the pixel structure 30 is connected to and controls only one type of monochromatic subpixels and white subpixels 140, the pixel structure 30 can be driven in a more flexible and more efficient manner.

Referring to FIG. 2 to FIG. 5, a display panel includes: a first substrate, a second substrate disposed opposite to the first substrate, and a driver module; and further includes the pixel structures (20 and 30). The pixel structures (20 and 30) are located in one of the first substrate and the second substrate. The driver module is configured to drive the pixel structures (20 and 30).

In an embodiment of this application, the first substrate may be, for example, an active switch array substrate, and the second substrate may be, for example, a color filter substrate. A color filter layer and an active switch array may also be disposed on a same substrate. This is not limited in this application.

In some embodiments, the display panel may be, for example, an OLED display panel, a QLED display panel, a plasma display panel, or a liquid crystal display panel, but is not limited thereto. The display panel may also be a curved display panel.

Still referring to FIG. 2 to FIG. 5, a display apparatus includes the display panel. The liquid crystal display panel is used as an example. The display apparatus further includes a backlight module. The backlight module may include a plurality of light sources of different colors.

In an embodiment, the light source may be, for example, an LED light source such as a three-primary-color light source including a red light source, a green light source, and a blue light source. The light sources of the three primary colors, when emitting light jointly, are equivalent to a white light backlight source. Because the light source is a three-primary-color light source, during display of a solid color image such as a red solid-color image, the red light source emits light individually to transmit a red subpixel and a white subpixel, to further increase penetration and to present a more saturated image.

In this application, a pixel structure is designed, so as to increase penetration and resolution of a panel, improve image display quality of the panel, and improve reliability.

The terms such as "in some embodiments" and "in various embodiments" are repeatedly used. The terms usually refer to different embodiments, but they may also refer to a same embodiment. The terms such as "comprising", "having" and "including" are synonyms, unless other meanings are indicated by the context.

Descriptions above are merely specific embodiments of this application, and are not intended to limit this application. Although this application has been disclosed above through the specific embodiments, the embodiments are not intended to limit this application. A person skilled in the art can make some equivalent variations, alterations or modifications to the above-disclosed technical content without departing from the scope of the technical solutions of this application to obtain equivalent embodiments. Any simple alteration, equivalent change or modification made to the above embodiments according to the technical essence of this application without departing from the content of the technical solutions of this application shall fall within the scope of the technical solutions of this application.

What is claimed is:

1. A pixel structure, comprising:
    a plurality of data lines;
    a plurality of scanning lines, disposed in a manner of intersecting with the data lines; and
    a plurality of pixel units, wherein each of the pixel units comprises a plurality of subpixels, and the subpixels are connected to the data lines and the scanning lines;
    wherein each of the pixel units comprises a plurality of monochromatic subpixels disposed in a form of an array and a plurality of white subpixels, the white subpixels and the monochromatic subpixels are disposed in pairs and adjacent to each other, and colors of the plurality of monochromatic subpixels in each of the pixel units are different;
    each of the pixel units has a two-column three-row structure;
    each of the pixel units comprises three monochromatic subpixels disposed in a form of an array in a first column and three white subpixels disposed in a form of an array in a second column;
    the data lines comprise a first data line and a second data line disposed at intervals, the first data line is connected to the monochromatic subpixels, and the second data line is connected to the white subpixels; and
    the scanning lines include a first scanning line, a second scanning line, and a third scanning line, each of the first, second and third scanning lines is connected to the monochromatic subpixels and the white subpixels.

2. The pixel structure according to claim 1, wherein each of the scanning lines is connected to the monochromatic subpixels and the white subpixels, and the monochromatic subpixels and the white subpixels are disposed at intervals and adjacent to each other.

3. A display panel, comprising:
    a first substrate;
    a second substrate, disposed opposite to the first substrate; and
    a pixel structure, comprising:
        a plurality of data lines;
        a plurality of scanning lines, disposed in a manner of intersecting with the data lines; and
        a plurality of pixel units, wherein each of the pixel units comprises a plurality of subpixels, and the subpixels are connected to the data lines and the scanning lines;
    wherein each of the pixel units comprises a plurality of monochromatic subpixels disposed in a form of an array and a plurality of white subpixels, the white subpixels and the monochromatic subpixels are disposed in pairs and adjacent to each other, and colors of the plurality of monochromatic subpixels in each of the pixel units are different;
    each of the pixel units has a two-column three-row structure;
    each of the pixel units comprises three monochromatic subpixels disposed in a form of an array in a first column and three white subpixels disposed in a form of an array in a second column;
    the data lines comprise a first data line and a second data line disposed at intervals, the first data line is connected to the monochromatic subpixels, and the second data line is connected to the white subpixels; and the scanning lines include a first scanning line, a second scanning line, and a third scanning line, each of the first, second and third scanning lines is connected to the monochromatic subpixels and the white subpixels.

4. The display panel according to claim 3, wherein each of the scanning lines is connected to the monochromatic subpixels and the white subpixels, and the monochromatic subpixels and the white subpixels are disposed at intervals and adjacent to each other.

5. A pixel structure, comprising:
a plurality of data lines;
a plurality of scanning lines, disposed in a manner of intersecting with the data lines; and
a plurality of pixel units, wherein each of the pixel units comprises a plurality of subpixels, and the subpixels are connected to the data lines and the scanning lines;
wherein each of the pixel units comprises a plurality of monochromatic subpixels disposed in a form of an array and a plurality of white subpixels, the white subpixels and the monochromatic subpixels are disposed in pairs and adjacent to each other, and the monochromatic subpixel is a red subpixel, a green subpixel, or a blue subpixel;

each of the pixel units has a two-column three-row structure, and comprises three monochromatic subpixels disposed in a form of an array in a first column and three white subpixels disposed in a form of an array in a second column, and colors of the plurality of monochromatic subpixels in each of the pixel units are different;

the data lines comprise a first data line and a second data line disposed at intervals, the first data line is connected to the monochromatic subpixels, and the second data line is connected to the white subpixels, and the monochromatic subpixels and the white subpixels are disposed at intervals and adjacent to each other;

the scanning line and the data line are separately or jointly driven, and each of the scanning lines is connected to and controls the monochromatic subpixels of a same color and the white subpixels; and the scanning lines include a first scanning line, a second scanning line, and a third scanning line, each of the first, second and third scanning lines is connected to the monochromatic subpixels and the white subpixels.

* * * * *